US009277444B2

(12) United States Patent
Meekel et al.

(10) Patent No.: US 9,277,444 B2
(45) Date of Patent: Mar. 1, 2016

(54) RESTRICTION OF BACKGROUND APPLICATION DATA DURING CONGESTION

(71) Applicant: Cellco Partnership, Basking Ridge, NJ (US)

(72) Inventors: Jacques Meekel, Hampton, NJ (US); Samir S. Vaidya, Highland Park, NJ (US); Christopher M. Schmidt, Branchburg, NJ (US); Mauricio Pati Caldeira de Andrada, South Plainfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 148 days.

(21) Appl. No.: 14/109,266

(22) Filed: Dec. 17, 2013

(65) Prior Publication Data

US 2015/0172955 A1 Jun. 18, 2015

(51) Int. Cl.
*H04W 28/02* (2009.01)
*H04W 24/00* (2009.01)
*H04W 72/00* (2009.01)
*H04L 12/859* (2013.01)
*H04L 12/825* (2013.01)

(52) U.S. Cl.
CPC ....... *H04W 28/0289* (2013.01); *H04L 47/2475* (2013.01); *H04L 47/263* (2013.01); *H04W 28/0247* (2013.01); *H04W 28/0284* (2013.01)

(58) Field of Classification Search
None
See application file for complete search history.

(56) References Cited

U.S. PATENT DOCUMENTS

| 2012/0023236 | A1* | 1/2012 | Backholm et al. | 709/226 |
|---|---|---|---|---|
| 2012/0278464 | A1* | 11/2012 | Lehane et al. | 709/223 |
| 2013/0294321 | A1* | 11/2013 | Wang et al. | 370/312 |
| 2014/0140213 | A1* | 5/2014 | Raleigh | H04L 67/2804 370/235 |
| 2014/0347983 | A1* | 11/2014 | Griot | 370/230 |

* cited by examiner

*Primary Examiner* — Brandon Renner

(57) ABSTRACT

To reduce the contribution of data communications for background applications to network congestion, the examples implement techniques in which congestion detection leads a mobile device to impose restriction on data communications by any application running in the background. The mobile device may detect congestion and/or the need to restrict background data communications in response to a message or instruction received from a node of the network; or the mobile device may itself more directly detect congestion from monitoring and analysis of device/network interaction behavior and trends. Upon detecting congestion, the mobile device turns on a background data restriction. For example, with the restriction on, all applications only running in the background without direct user interaction are blocked from sending requests for data communication to/through the network. However, with the restriction active, the mobile device can still provide data communication in response to user interaction with the device.

20 Claims, 5 Drawing Sheets

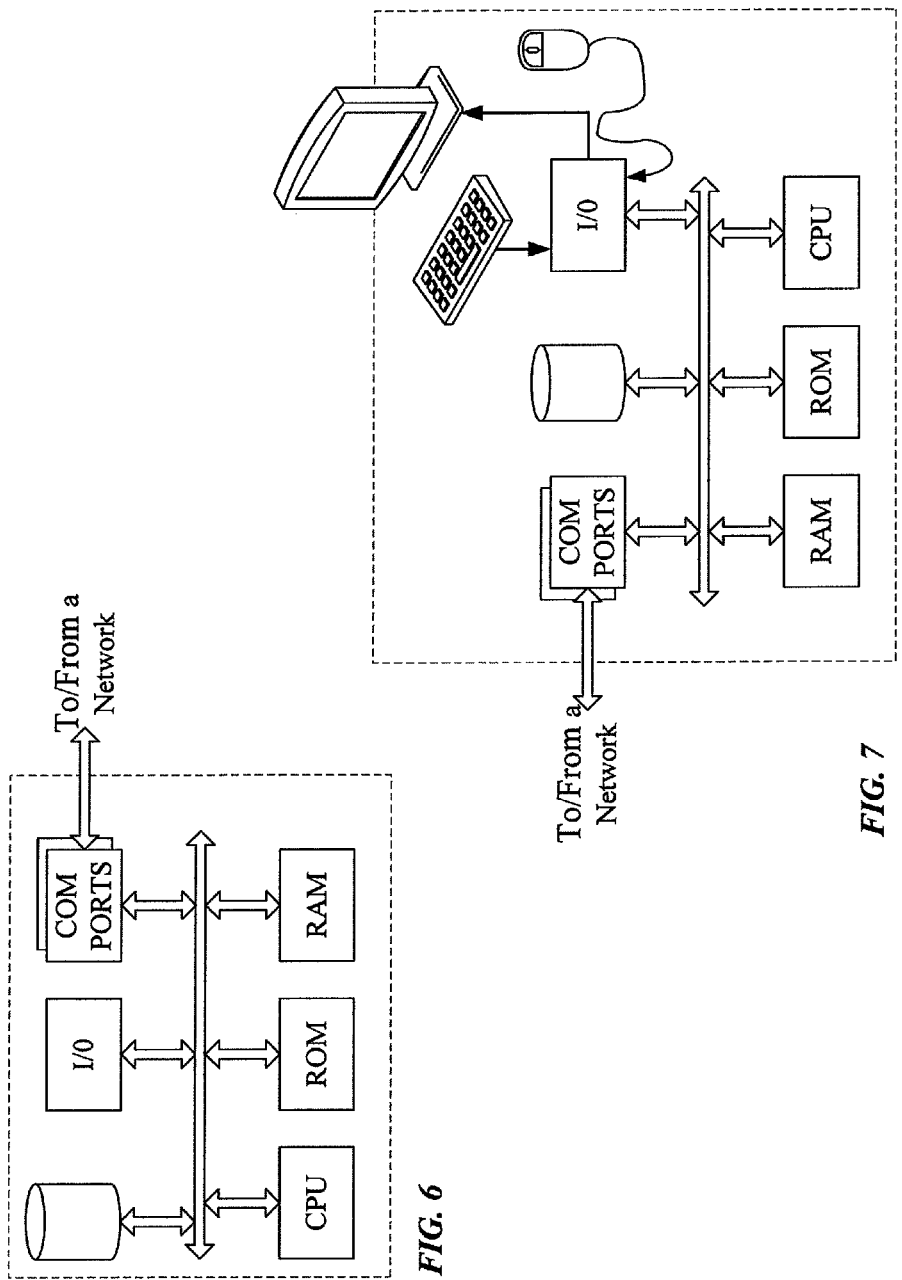

RESTRICTION OF BACKGROUND APPLICATION DATA DURING CONGESTION

BACKGROUND

In recent years, smartphones have become very popular. Communications via a network may be responsive to a user's current operation of the mobile device. However, many smartphone applications run in the background and generate data communications while the user operates the device for other purposes or is not actively using the device at all.

Smartphone users, however, may experience slow service and/or dropped calls when wireless network congestion exists. Wireless network congestion may occur when unanticipated high concentration of smartphone users in the same proximity leads to multiple applications of multiple smartphones attempting to establish data communications, even without user intervention. Typically, wireless network congestion is determined by the wireless network; and attempts to relieve the wireless network congestion involve the wireless network rejecting successive requests to establish data communications or calls. This response by the wireless network generates additional load on the wireless network and may, at least initially, exacerbate the wireless network congestion.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6 is a simplified functional block diagram of a computer that may be configured as a host or server, for example, to function as the application server in the system of FIG. 1.

FIG. 7 is a simplified functional block diagram of a personal computer or other work station or terminal device.

DETAILED DESCRIPTION OF EXAMPLES

Figure 1:
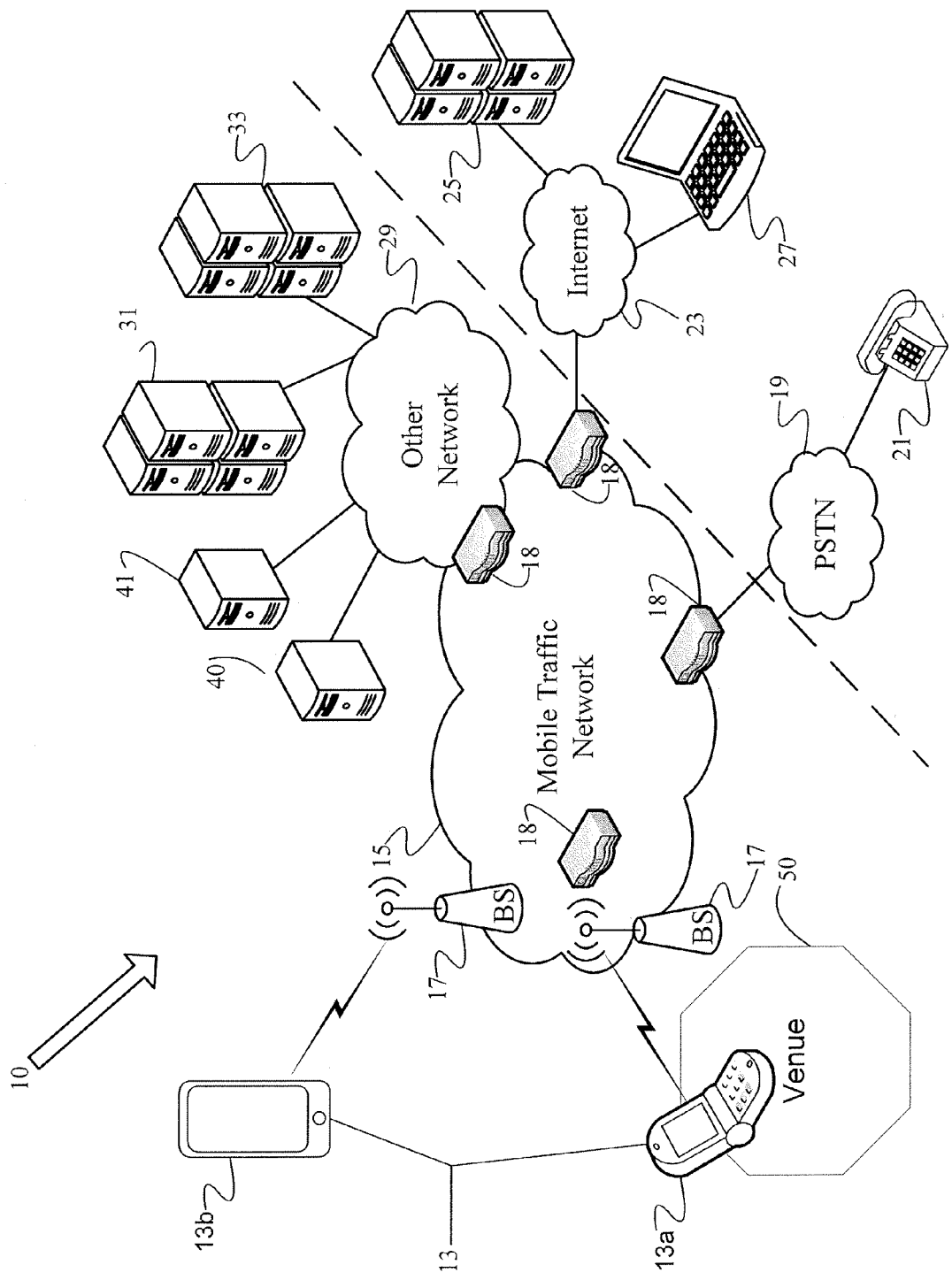
FIG. 1 is a high-level functional block diagram of an example of a system of networks/devices that provide various communications for mobile devices and support an example of a background application data restriction service.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

In general, a need exists for a mobile device, such as a smartphone, that may determine when wireless network congestion exists and automatically limit requests by the mobile device to establish data communications, for example, in a manner that may help to reduce network congestion yet not substantially reduce the user's enjoyment of many of the desirable functions of the device.

Heavy usage of mobile network resources causes congestion that can result in slow service and/or dropped calls. Many applications on smartphones run in the background, even when users are not actively operating the mobile devices; and many of the background activities involve data communications. For example, many applications periodically check with a server to obtain notifications that the application will offer to the user, e.g. as news updates. As another example, applications periodically check with a server for software updates. When the device is actively operated by the user, these background data communication functions often consume a minority of network resources. However, under some circumstances, they may still exacerbate network congestion. For example, when a large crowd with smartphones are gathered in a relatively small geographic area, e.g. in a sports venue, the large number of mobile devices requesting background communications through one or a small number of network nodes may cause significant loading on the affected network resources. Users actively seeking service, e.g. to make voice calls or obtain specifically requested information, may experience service delays or even dropped calls.

To reduce the contribution of data communications for background applications to network congestion, the examples described below implement techniques in which congestion detection leads a mobile device to impose restriction of data communications by applications running in the background. The mobile device may detect congestion and/or the need to restrict background data communications in response to a message or instruction received from a node of the network; or the mobile device may itself more directly detect congestion from monitoring and analysis of device/network interaction behavior and trends.

Upon detection of congestion, the mobile device turns on a background data restriction. In the example, the background restriction applies to all applications running in the background. For example, with the restriction on, applications running in the background without direct user interaction are blocked from sending requests for data communication to/through the network. However, even with the restriction active, the mobile device can still provide the user with the capability to interact with and use the device if desired, e.g. by operating the device to make a voice call or by activating an application so as to make a call or request a specific data service. For example, a device in a pocket will not originate a data connection for a background function (unless inadvertently activated), but a device with direct user interaction will originate a data connection for an active operation.

Reference now is made in detail to the examples illustrated in the accompanying drawings and discussed below.

FIG. 1 illustrates a system 10 offering a variety of mobile communication services, including communications for wireless data by mobile devices 13 of various users. The example shows simply two mobile devices 13a and 13b as well as a mobile communication network 15. The devices 13a and 13b are examples of mobile devices that may be used for the background application data restriction service. However, the network will provide similar communications for many other similar users as well as for mobile devices/users that do not participate in the background application data restriction service. The network 15 provides mobile wireless communications services to those devices as well as to other mobile devices (not shown), for example, via a number of base stations (BSs) 17. The present techniques may be implemented in any of a variety of available mobile networks 15 and/or on any type of mobile device compatible with such a network 15, and the drawing shows only a very simplified example of a few relevant elements of the network 15 for purposes of discussion here.

The mobile communication network 15 may further provide communication services to mobile devices 13 that are located within a venue 50. In the example of FIG. 1, mobile device 13a is located within Venue 50 and mobile device 13b is not located within Venue 50 although at other times they may both be in the Venue 50 (with other mobile devices). This, however, is only for simplicity. Venue 50 may be, for example, a sports arena or stadium. Venue 50 may, for example, have capacity for a large number of users of mobile devices 13. Such large number of mobile devices 13 within close geographical proximity served by a common one or more of the base stations 17 might exceed the planned capacity and may cause congestion on at least a portion of the mobile communication network 15. The congestion on the mobile communication network 15 caused by the large number of mobile devices 13 may result in slow service and/or dropped calls for those devices at the venue 50 and possibly in some surrounding areas.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, a 4G long term evolution (LTE) standard or other standards used for public mobile wireless communications. The mobile devices 13 may be capable of voice telephone communications through the network 15; and, for the background application data restriction services, the examples of devices shown at 13a and 13b are capable of data communications through the particular type of network 15 (and the users thereof typically will have subscribed to data service through the network).

The network 15 allows users of the mobile devices such as 13a and 13b (and other mobile devices not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile devices 13 via the Internet 23 may be with devices like those shown at 25 and 27 as well as with a variety of other types of devices or systems capable of data communications through various interconnected networks. The mobile devices 13a and 13 of users of the background application data restriction service also can receive and execute applications written in various programming languages, as discussed more later.

Mobile devices 13 can take the form of portable handsets, smart-phones or personal digital assistants, although they may be implemented in other form factors. Program applications, including an application to assist in the background application data restriction service and/or any an application purchased via an on-line service can be configured to execute on many different types of mobile devices 13. For example, a mobile device application can be written to execute on a binary runtime environment for mobile (BREW-based) mobile device, a Windows Mobile based mobile device, Android, iOS for iPhone or iPad, Java Mobile, or RIM based mobile device such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile devices 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile devices 13, when the mobile devices are within range. Each base station can include a BTS coupled to several antennae mounted on a radio tower within a coverage area often referred to as a "cell." The BTS is the part of the radio network that sends and receives RE signals to/from the mobile devices 13 that are served by the base station 17. Although referred to here generically using the term base stations, these radio access points on the edge of the network may be referred to by other terms. In a 4G LTE network implementation, for example, the base stations are implemented by equipment identified as eNodeBs.

The radio access networks can also include a traffic network represented generally by the cloud at 15, which carries the user communications and data for the mobile devices 13 between the base stations 17 and other elements with or through which the mobile devices communicate. The network can also include other elements that support functionality other than device-to-device media transfer services such as messaging service messages and voice communications. In a LTE/IP Multimedia Subsystem (IMS) implementation, for example, IP packet flows are regulated by various packet switching/routing nodes configured as call/session control function (CSCF) nodes 18. Call set-up, however, is asserted/controlled by application servers 31 in the IMS core, e.g. voice calls and video calls use session initiation protocol (SIP) servers. Specific elements of the network 15 for carrying the voice and data traffic and for controlling various aspects of the calls or sessions through the network 15 as well as elements of or communicating through network 29 are omitted here for simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. It should be apparent, however, that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31. In a 4G/LTE/IMS implementation, for example, the network 29 and the equipment accessible via that network form the IMS core.

A mobile device 13 communicates over the air with a base station 17 and through the traffic network 15 for various voice and data communications, e.g. through the Internet 23 with a server 25 and/or with application servers 31. Such communication may be in response to a user interacting with an application, e.g. a web browser. Alternatively, the communication may be in response to an application operating without current user interaction, e.g. a social networking application requesting or receiving a status update. Servers such as 25 and 31 may provide any of a variety of common application or service functions in support of or in addition to an application program running on the mobile device 13. However, for purposes of further discussion, we will focus on functions thereof in support of the background application data restriction service. For a given service, including the background application data restriction service, an application program within the mobile device may be considered as a 'client' and the programming at 41 may be considered as the 'server' application for the particular service.

If the mobile service carrier offers the background application data restriction service, the service may be implemented on a carrier operated mobile network node 41, for communication via the networks 15 and 29. In addition, the mobile service carrier may implement a wireless data communication congestion detector 40 for detecting wireless data communication congestion and notifying the mobile network node 41 of such congestion. Although shown separately, the functions of 40 and 41 may be combined in one server or the like. When there is network congestion, functions of applications running only in the background can be restricted. Even with such a restriction active, functions that are actively supporting current user operation of the device (e.g. operating in the foreground) are allowed access to network communication service(s). The foreground functions, for example, may be voice calls, mobile text or multimedia messaging, and/or data functions or applications actively selected by the user.

The background application data restriction service under consideration here may be delivered to touch screen type mobile devices as well as to non-touch type mobile devices. Hence, our simple example shows the mobile device 13a as a non-touch type mobile device and shows the mobile device 13b as a touch screen type mobile device. Implementation of the background application data restriction service will involve at least some execution of programming in the mobile devices as well as implementation of user input/output functions and data communications through the network 15, from the mobile devices. Congestion detection may be implemented in network elements, e.g. mobile network node 41 and/or wireless data communication congestion detector 40, or in mobile devices 13.

It may be useful to consider the functional elements/aspects of examples of two types of mobile devices 13a and 13b, at a high-level.

Figure 2:
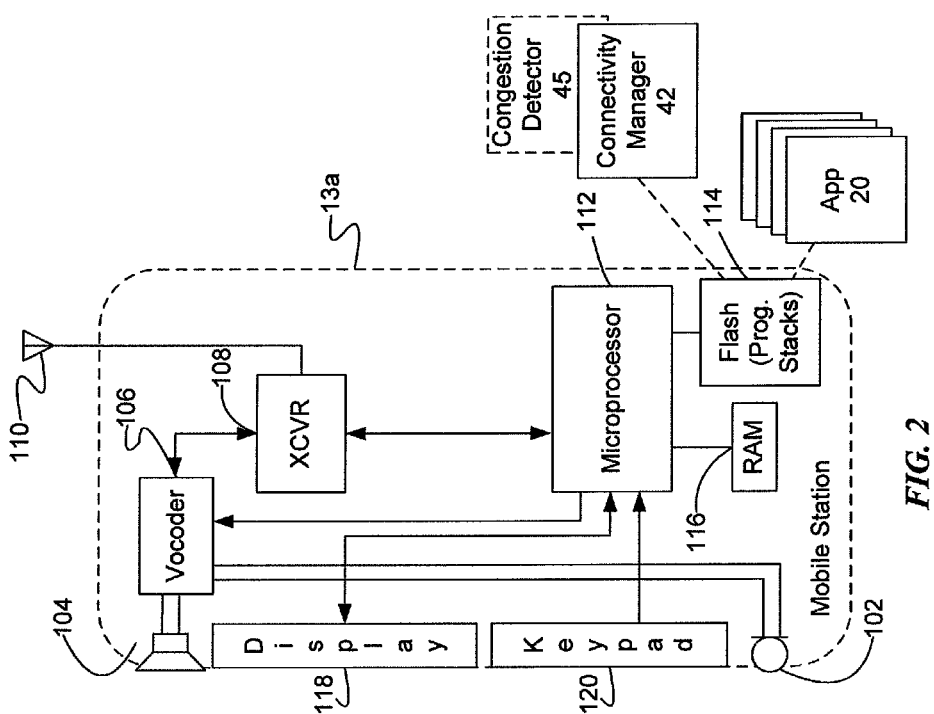
FIG. 2 is a high-level functional block diagram of a non-touch type mobile device, as an example of a device that may utilize the background application data restriction service through a network/system like that shown in FIG. 1.

For purposes of such discussion, FIG. 2 provides a block diagram illustration of an example of a non-touch type mobile device 13a. Although the mobile device 13a may be a smartphone or may be incorporated into another device, such as a personal digital assistant (PDA) or the like, for discussion purposes, the illustration shows the mobile device 13a is in the form of a handset. The handset embodiment of the mobile device 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, including wireless data communications, the handset 13a also includes at least one digital transceiver (XCVR) 108. Today, the handset 13a would be configured for digital wireless communications using one or more of the common network technology types. The concepts discussed here encompass embodiments of the mobile device 13a utilizing any digital transceivers that conform to current or future developed digital wireless communication standards. The mobile device 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile device 13a includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

A microprocessor 112 serves as a programmable controller for the mobile device 13a, in that it controls all operations of the mobile device 13a in accord with programming that it executes, for all normal operations, and for operations involved in the background application data restriction procedure under consideration here. In the example, the mobile device 13a includes flash type program memory 114, for storage of various "software" or "firmware" program routines and mobile configuration settings, such as mobile directory number (MDN) and/or mobile identification number (MIN), etc. The mobile device 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software, a connectivity manager 42, a congestion detector 45, and vocoder control software, and any of a wide variety of other applications 20, such as client browser software and short message service software, any of which may operate with active user intervention or in the background without user intervention. Some of applications 20 may, for example, generate data communication over the mobile network 15 without interaction with a user of mobile device 13a. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile device 13a includes a processor, and programming stored in the flash memory 114 configures the processor so that the mobile device is capable of performing various desired functions, including in this case the functions involved in the technique for providing background application data restriction.

Figure 3:
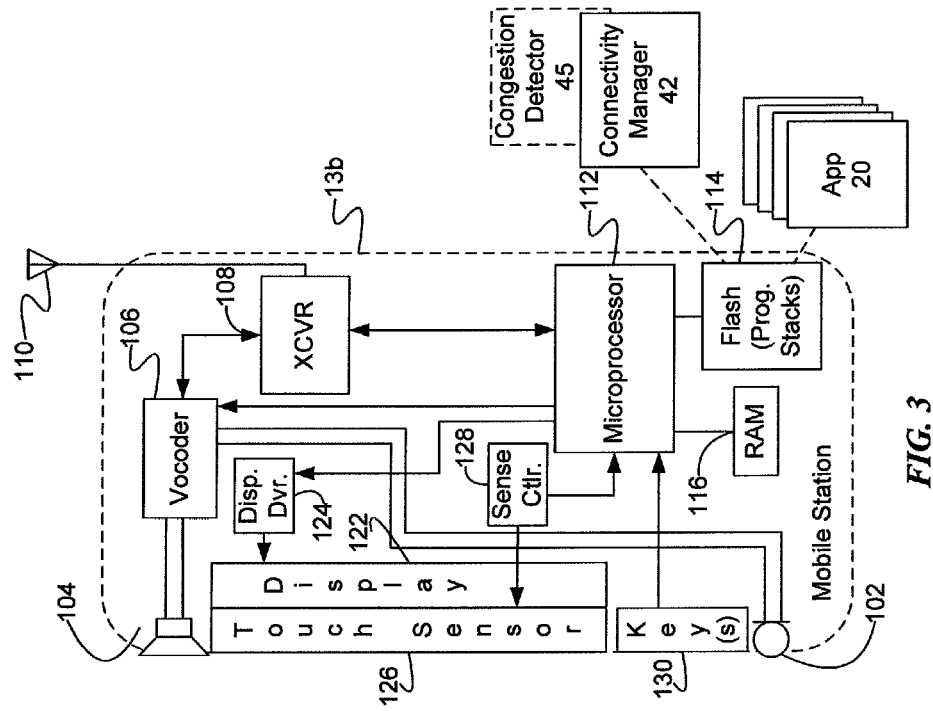
FIG. 3 shows, in high-level functional block diagram form, a touch screen type mobile device, as another example of a device that may utilize the background application data restriction service through a network/system like that shown in FIG. 1.

For purposes of such a discussion, FIG. 3 provides a block diagram illustration of an example of a touch screen type mobile device 13b. Although possibly configured somewhat differently, at least logically, a number of the elements of the touch screen type mobile device 13b are similar to the elements of mobile device 13a, and are identified by like reference numbers in FIG. 3. For example, the touch screen type mobile device 13b includes a microphone 102, speaker 104 and vocoder 106, for audio input and output functions, much like in the earlier example. The mobile device 13b also includes at least one digital transceiver (XCVR) 108, for digital wireless communications, although the handset 13b may include an additional digital or analog transceiver. The concepts discussed here encompass embodiments of the mobile device 13b utilizing any digital transceivers that conform to current or future developed digital wireless communication standards. As in the mobile device 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of mobile device 13a, a microprocessor 112 serves as a programmable controller for the mobile device 13b, in that it controls all operations of the mobile device 13b in accord with programming that it executes, for all normal operations, and for operations involved in the background application data restriction procedure under consideration here. In the example, the mobile device 13b includes flash type program memory 114, for storage of various program routines and mobile configuration settings. The mobile device 13b may also include a non-volatile random access memory (RAM) 116 for a working data processing memory. Of course, other storage devices or configurations may be added to or substituted for those in the example. Similar to the implementation of mobile device 13a, the flash type program memory 114 stores firmware such as a boot routine, device driver software, an operating system, call processing software, a connectivity manager 42, a congestion detector 45, and vocoder control software, and any of a wide variety of other applications 20, such as client browser software and short message service software, any of which may operate with active user intervention or in the background without user intervention. Some of applications 20 may, for example, generate data communication over the mobile network 15 without interaction with a user of mobile device 13a.

Hence, outlined above, the mobile device 13b includes a processor, and programming stored in the flash memory 114 configures the processor so that the mobile device is capable of performing various desired functions, including in this case the functions involved in the technique for providing background application data restriction.

In the example of FIG. 2, the user interface elements included a display and a keypad. The mobile device 13b may have a limited number of key 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the mobile device 13b in our example includes a display 122, which the microprocessor 112 controls via a display driver 124, to present visible outputs to the device user. The mobile device 13b also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile device 13b. The microphone 102 and speaker 104 may be used as additional user interface elements, for audio input and output.

The structure and operation of the mobile devices 13a and 13b, as outlined above, were described to by way of example, only.

Figure 4:
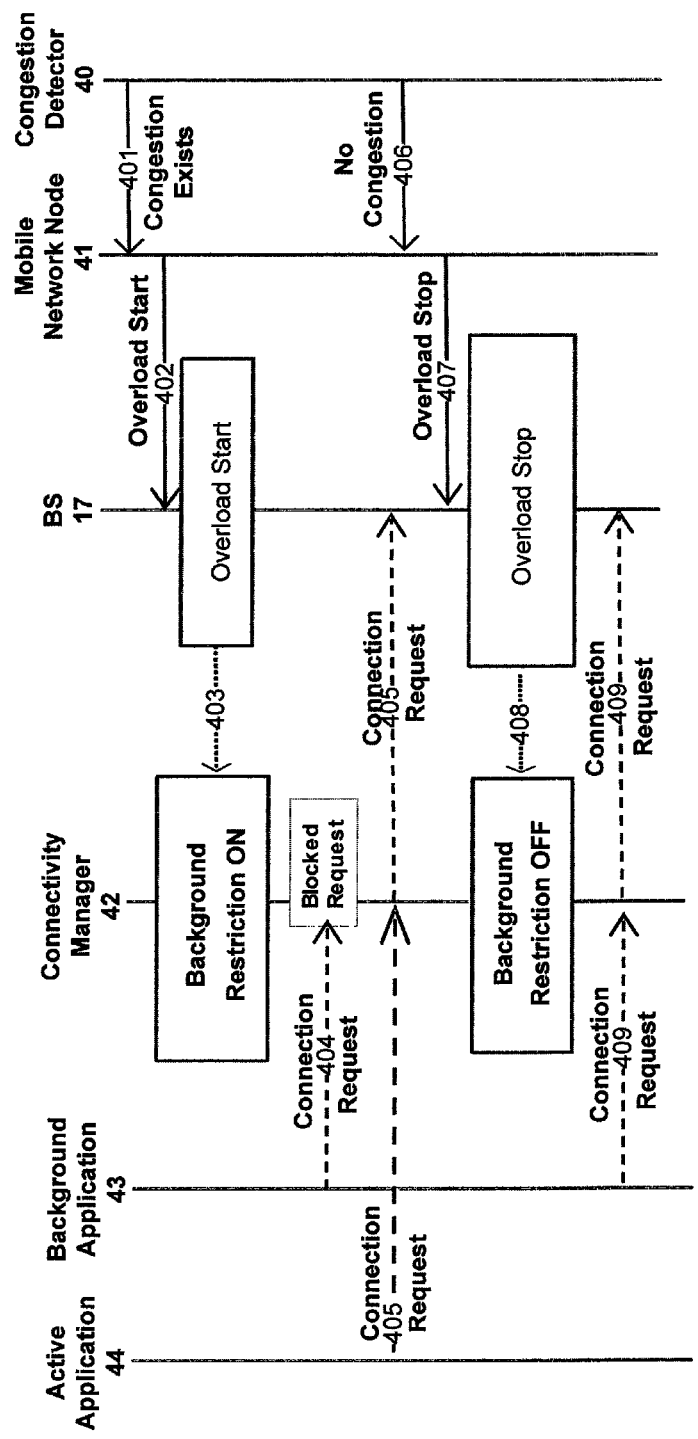
FIG. 4 is an example of a process diagram depicting the processes performed by the elements involved in the background application data restriction service.

FIG. 4 depicts a process, by way of example, that may be performed by various elements involved in restricting background application data communications to avoid and/or mitigate wireless data communication congestion. The process starts when a mobile network node 41 detects the mobile traffic network 15 is subject to wireless data communication congestion through an identified one or more of the base stations 17. Such detection may be, for example, based on a notification of wireless data communication congestion received, in 401, from a wireless data communication congestion detector 40. Alternatively, the mobile network node 41 may be configured to detect the mobile traffic network 15 is subject to wireless data communication congestion through an identified one or more of the base stations 17 based on analysis of wireless data communication in the mobile traffic network 15.

For purposes of an example, FIG. 4 shows a process flow in which congestion is detected in the network by detector 40 and node 41 sends notifications to mobile devices 13. Traffic level may be analyzed with respect to various parameters, such as up or down stream packet flow rate, latency, etc.; and each parameter may be compared to one or more applicable parameters. Wireless data communication congestion may be detected, for example, when packet traffic flow for wireless data communication to/from mobile devices 13 through base station 17 reaches a rate threshold, when wireless data communication traffic flow through a base station 17 remains at or above a threshold level for some period of time, when latency related to wireless data communications exceeds a threshold, when some combination of these criteria is met, or when traffic condition(s) meet some other criteria. Some number of applicable thresholds may apply in a related manner (e.g. for traffic above a threshold, the restriction is triggered when latency reaches an associated threshold).

Once the mobile network node 41 detects the wireless data communication congestion, the mobile network node 41 identifies one or more mobile devices 13 situated to obtain mobile communications services through the impacted base station(s) 17 (e.g. mobile devices 13 currently registered through base stations 17, serving Venue 50) and notifies the one or more mobile devices 13 to activate a background data communication restriction. The mobile network node 41 may identify, for example, the one or more mobile devices 13 to notify based on the geographic proximity of the mobile devices 13 to each other and to the base stations 17. Alternatively or in addition, the mobile network node 41 may identify, for example, the one or more mobile devices 13 to notify based on the contribution each mobile device 13 is making to the wireless data congestion. In one example, the mobile network node 41 may only notify all of the mobile devices 13 currently being served by the identified one or more base stations 17. In this example, any mobile devices 13 subsequently served by the identified one or more base stations 17 would not be subject to a background data communication restriction. Alternatively, the mobile network node 41 may notify all of the mobile devices 13 currently being served by the identified one or more base stations 17 and any mobile devices 13 that subsequently register for service through the identified one or more base stations 17 while the congestion persists.

In a different example, the mobile network node 41 may notify only those mobile devices 13 currently being served by the identified one or more base stations 17 and having the greatest contribution to the wireless data communication congestion.

The mobile network node 41 notifies, in 402, each determined mobile device 13 by sending an overload start message to the identified one or more base stations 17 and the identified one or more base stations 17, in 403, sends the notice to each determined mobile device 13. The identified one or more base stations 17 may, for example, send the notice as a single broadcast message to all mobile devices 13 currently being served by the identified one or more base stations 17 or as an individual message to each determined mobile device 13. The broadcast message may, for example, contain information identifying each determined mobile device 13 such that, if fewer than all mobile devices 13 currently being served by the identified one or more base stations 17 are intended to receive the notice, each determined mobile device 13 will recognize the notice based on the identifying information contained in the broadcast message and activate the background data communication restriction. Alternatively, the notification could be configured for receipt and processing by all mobile stations receiving the notification or all mobile devices receiving the notification through the congested base station(s) 17. The notification would include an instruction, in the present example, to turn on background restriction. The instruction may also specific a level, if the implementation of restriction distinguishes different levels of restriction, e.g. with respect to different types of background applications.

In this example, a mobile device 13 recognizes an appropriate message from the mobile network node 41, e.g., the start message, and determines the network is subject to wireless data communication congestion. Mobile device 13 may, for example, execute a connectivity manager 42. Depending on the manufacturer of and the operating system running on mobile device 13, the connectivity manager 42 may be implemented as an application program accessible by the user of the mobile device 13 or a system function embedded in mobile device 13. For example, the Android operating system implements the connectivity manager 42 as a user accessible application program. A user of a mobile device 13 running Android, for example, may decide to proactively restrict background wireless data communications by manually interacting with the connectivity manager 42. However, other users may not be aware of the functionality of the connectivity manager 42 or simply may choose not to utilize the functionality. In an Android device, an implementation of the background data restriction might involve a modification of the Android connectivity manager to receive start and stop notifications from the mobile network node 41 and activate and deactivate the background restriction accordingly.

As a further modification, connectivity manager 42 distinguishes between different types of background applications and the background restriction applies variably to the different types of background applications. For example, one type of background application maintains a persistent connection and regularly communicates via the persistent connection. Another type of background application does not maintain a persistent connection and only awaits irregular communications. In this example, various levels of network congestion are detected and the connectivity manager 42 restricts the different types of background applications based on the different levels of network congestion. Different levels of network congestion are, for example, low, moderate, and high. Slight delays in traffic may be symptomatic of low congestion, severe delays in traffic may be symptomatic of moderate congestion, and data connection failures may be symptomatic of high congestion. In low and moderate congestion, for example, the connectivity manager 42 only restricts communications from the type of background application with a persistent connection. In a time of high congestion, the connectivity manager 42 restricts both types of background applications. In a network example in which a detector and node (e.g. 40, 41) notify the mobile device of congestion, the notification could indicate the level of congestion or the type(s) of background restriction. In a example in which the mobile device determines congestion from monitoring wireless activity, the mobile device may compare traffic parameters to appropriate thresholds to determine levels of congestion and decide which types of background restriction to apply.

Returning to the example of FIG. 4, the overload start message sent from the mobile network node 41 via the identified one or more base stations 17 instructs the connectivity manager 42 on each determined mobile device 13 to activate the background data communication restriction. Thus, the mobile traffic network 15 may, for example, automatically control wireless data communication congestion without involvement from the user of each determined mobile device 13. In one example, connectivity manager 42 further provides notification to the user of mobile device 13 that background data communication restriction is active (e.g. notice on display of mobile device 13). Alternatively, connectivity manager 42 activates background data communication restriction without notice to the user of mobile device 13, such that the user is unaware of any background data communication restriction. If selective restriction of background data communication based on types of background applications, as described above, is active, the user notification may specify the types of applications that are being restricted and/or specific applications restricted. In an additional example, mobile network node 41 tracks historical information regarding activation and deactivation of background data communication restriction related to a particular Venue 50 (e.g. date and time of previous overload start and overload stop messages). Such historical information may be stored in a database and/or some other local storage medium. Based on the historical information and in anticipation of future activation, mobile network node 41 may direct identified base station(s) 17 to inform connectivity manager 42 of such anticipated future activation and connectivity manager 42 may provide notification of anticipated activation to the user of mobile device 13 (e.g. notice on display of mobile device 13).

When the background data communication restriction is activated by the connectivity manager 42, and a background application 43 makes a connection request for wireless data communication, in 404, the connectivity manager 42 will block the connection request. A background application 43 is an application program that currently is running without control of and/or active access to the display and/or other user input/output function(s) of the mobile device 13 (although at other times, the same application may control and/or have active access to the display and/or other user input/output function(s)). For example, although one application running on a mobile device 13 controls the screen of mobile device 13 (e.g., displaying output and/or receiving user input), other applications continue to run, in the background, without control of the screen of mobile device 13. As a further example, if a user of mobile device 13 is not actively interacting (e.g. waiting for a web page to load in response to the user selecting a hyperlink) with an application, but the application continues to control and/or have active access to the display and/or other user input/output function(s), then this application remains the active application and all other applications are currently background applications.

At the same time, when the background data communication restriction is activated by the connectivity manager 42 and an active application 44 makes a connection request for wireless data communication, in 405, the connectivity manager 42 allows the connection request. An active application 44 is an application program that currently has control and/or active access to the display of mobile device 13 and/or other user input/output function(s) and is running with active interaction with the user of the mobile device 13 (e.g., with output to and/or input from the device user). In the previous example, the one application controlling the screen of mobile device 13 is an active application. Connectivity manager 42 may be able to detect or is aware of states of applications, at least when the applications execute on the device. Some communication requests may also indicate type in a manner related to background activity, e.g. request regarding a notification service. The connectivity manager 42, therefore, distinguishes background communication as that communication related to a background application and active communication as that communication related to an active application, based on application states and/or communication request types.

At some later time, the mobile network node 41 may detect the mobile traffic network 15 is no longer subject to wireless data communication congestion through an identified one or more of the base stations 17. Such detection may be, for example, based on a notification that the mobile traffic network 15 is no longer subject to wireless data communication congestion received, in 406, from a wireless data communication congestion detector 40. Alternatively, the mobile network node 41 may be configured to detect the mobile traffic network 15 is no longer subject to wireless data communication congestion through an identified one or more of the base stations 17 based on analysis of wireless data communication in the mobile traffic network 15. The lack of wireless data communication congestion may be detected, for example, when wireless data communication to/from mobile devices 13 through base station 17 falls below a threshold, when wireless data communication through a base station 17 remains below a threshold level for some period of time, when latency related to wireless data communications is within a threshold, when some combination of these criteria is met, or when some other criteria are met.

The mobile network node 41 provides notification, in 407, that the mobile traffic network 15 is no longer subject to wireless data communication congestion through an identified one or more base stations 17 by sending an overload stop message to the identified one or more base stations 17. Such notification may be directed only to those mobile devices 13 previously determined during the background data restriction activation process or to all mobile devices 13 currently served by the identified one or more base stations 17. The identified one or more base stations 17, in 408, sends the notice to the appropriate mobile device 13. The identified one or more base stations 17 may, for example, send the notice as a single broadcast message to all mobile devices 13 currently being served by the identified one or more base stations 17 or as an individual message only to each previously determined mobile device 13. The broadcast message may, for example, contain information identifying each previously determined mobile device 13 such that, if fewer than all mobile devices 13 currently being served by the identified one or more base stations 17 are intended to receive the notice, each determined mobile device 13 will recognize the notice and deactivate the background data communication restriction.

In one scenario, all mobile devices 13 within venue 50 may receive an overload start message as a generic broadcast from the identified one or more base stations 17 to activate the background data restriction and all mobile devices 13 within the venue 50 may receive an overload stop message as a generic broadcast from the identified one or more base stations 17 to deactivate the background data restriction. Alternatively, only those mobile devices 13 determined to be notified may receive an overload start message, either as an individual message directed to the individual mobile device 13 or as a broadcast containing identifying information of the determined mobile devices 13 received by all mobile devices 13 within venue 50. In this alternative scenario, the overload stop message may likewise be sent either as individual messages directed to individual mobile devices 13 or as a broadcast containing identifying information of the determined mobile devices 13 received by all mobile devices 13 within venue 50. Further in this alternative scenario, the overload stop message may instead be sent as a generic broadcast to all mobile devices 13 within the venue 50 currently served by the identified one or more base stations 17. In an additional scenario, when a mobile device 13 subject to background data restriction leaves the venue and is no longer served by the identified one or more base stations 17 without receiving notification to deactivate the background data restriction, the mobile device 13 may deactivate the background data restriction based on an elapsed time, determination by the mobile device 13 that wireless data communication congestion no longer affects the mobile device 13, recognition by the mobile device 13 that it is no longer served by the identified one or more base stations 17, or some other indication that deactivation is appropriate. Although previous examples depict background restriction activation and deactivation notifications as overload start and overload stop messages, such notifications are by way of example only and notifications may be delivered via different message types and/or messages containing different formats and/or contents sufficient to indicate a activation and/or deactivation directive. Such notifications may be delivered in any fashion as is known and/or may become known between a wireless data communication network node, such as network node 41 and a mobile device, such as mobile device 13.

The overload stop message sent from the mobile network node 41 via the identified one or more base stations 17 instructs the connectivity manager 42 on each determined mobile device 13 to deactivate the background data communication restriction. A background application 43 may then make a connection request for wireless data communication, in 409, and the connectivity manager 42 will allow the connection request.

Figure 5:
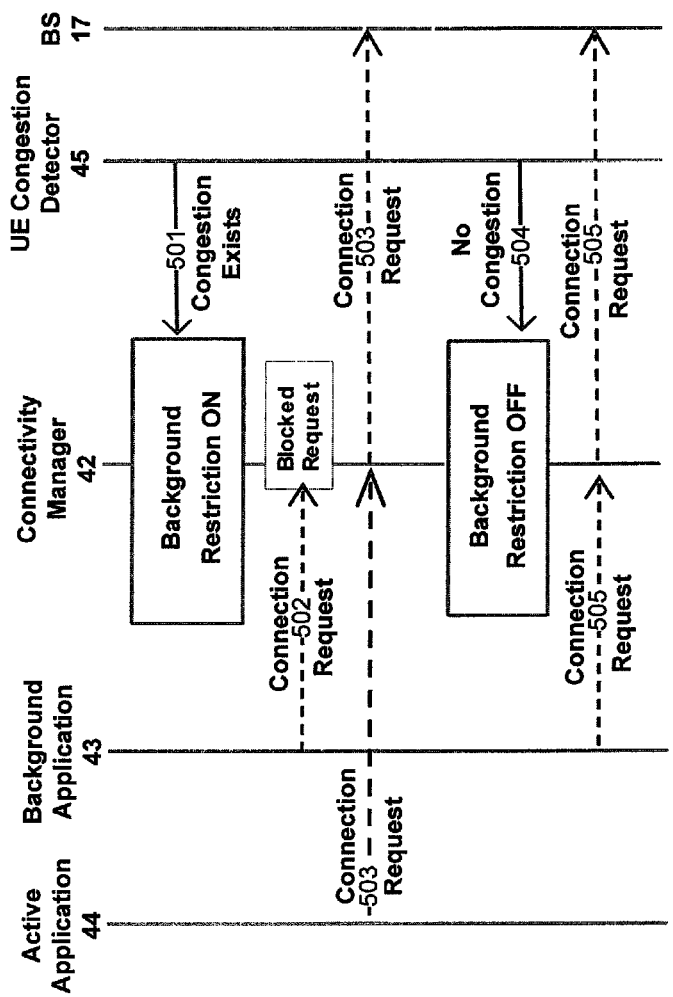
FIG. 5 is an example of a process diagram depicting the alternative processes performed by the elements involved in the background application data restriction service.

FIG. 5 depicts an alternative process, by way of example, in which the mobile device 13 may restrict background application data communications to avoid and/or mitigate wireless data communication congestion. In this example, mobile device 13 may further comprise a congestion detector 45. The congestion detector 45 may be, for example, an application stored in the flash type program memory 114 of mobile device 13. Congestion detector 45 may, for example, determine that the mobile traffic network 15 is subject to wireless data communication congestion, for example, based on monitoring the latency of Domain Name Server (DNS) queries, Transmission Control Protocol (TCP) connections or the access time to a server with a known latency benchmark.

Such determination may be, for example, based on an existing condition, a criteria exceeding a threshold, or developing a trend of mobile device 13/mobile traffic network 15 interaction indicative of wireless data communication congestion as a result of monitoring and analysis of interaction of the mobile device 13 with the mobile traffic network 15. For example, congestion detector 45 may measure latency and/or delay related to wireless data communications over a period of time. When such measurement exceeds a threshold, either as a single value or sustained over a time period, congestion detector 45 may determine wireless data communication congestion exists.

As a further example, congestion detector 45 may be configured to determine a relative level of congestion. For example, when measured latency is only slightly raised, then wireless data communication congestion is determined to be moderate. When measured latency is very high, however, then wireless data communication congestion is determined to be high. Alternatively, or in conjunction with measured latency, the number of failed connections could be calculated and, when few failed connections exist, congestion is determined to be moderate while congestion is determined to be high when multiple failed connections exists.

When the congestion detector 45 determines wireless data communication congestion exists, the congestion detector 45 instructs, in 501, the connectivity manager 42 to activate the background data communication restriction. Once the background data communication restriction is activated, the connectivity manager 42 will reject, in 502, a wireless data communication connection request from background application 43 and allow, in 503, a wireless data communication connection request from active application 44, in a similar fashion as described above in relation to FIG. 4.

The congestion detector 45 may then determine the mobile traffic network 15 is no longer subject to wireless data communication congestion. Such determination may be, for example, based on lack of an existing condition, a criteria falling below a threshold, or developing a trend of mobile device 13/mobile traffic network 15 interaction indicative of the lack of wireless data communication congestion as a result of monitoring and analysis of interaction of the mobile device 13 with the mobile traffic network 15.

When the congestion detector 45 determines wireless data communication congestion no longer exists, the congestion detector 45 instructs, in 504, the connectivity manager 42 to deactivate the background data communication restriction. Once the background data communication restriction is deactivated, the connectivity manager 42 will allow, in 505, a wireless data communication connection request from either background application 43 or active application 44, in a similar fashion as described above in relation to FIG. 4.

In an example where congestion detector 45 or congestion detector 40 determines a relative level of congestion, connectivity manager 42 may be configured with one or more variable timers (e.g. active timer and inactive timer). Connectivity manager 42 may then utilize the variable timers to activate and deactivate the background data communication restriction only for variable amounts of time during the period of congestion, where the on time is reduced as congestion increases. For example, congestion detector 45 determines that wireless data communication congestion is only moderate, in which case connectivity manager 42 sets the background restriction active timer to 2 minutes and the background restriction inactive timer to 1 minute. In this example, connectivity manager 42 activates the background data communication restriction for 2 minutes, then deactivates the background restriction for 1 minute. During the period of moderate congestion, connectivity manager 42 will continue, for example, to cycle between active and inactive background restriction.

In a similar example, congestion detector 45 determines that wireless data communication congestion is high and connectivity manager 42 sets the background restriction active timer to 10 minutes and the background restriction inactive timer to 2 minutes. In this example, connectivity manager 42 activates the background restriction for 10 minutes and deactivates the background restriction for 2 minutes. During the period of high congestion, connectivity manager 42 will continue, for example, to cycle between active and inactive background restriction.

In the examples where connectivity manager 42 is configured with variable timers, connectivity manager 42 may also be configured with a random back-off timer. In order to avoid all mobile devices 13 deactivating a background restriction and re-starting background transmissions at the same time during periods of congestion, the connectivity manager 42 of each mobile device 13 will initiate the background restriction variable timers (e.g. active timer and inactive timer) based on the random back-off timer. As a result, permitted background transmissions should tend to occur at randomly distributed times.

Restriction of background application data during congestion were described to by way of examples, only.

FIGS. 6 and 7 provide functional block diagram illustrations of general purpose computer hardware platforms. FIG. 6 illustrates a network or host computer platform, as may typically be used to implement a server. Such network or host computer may be used, for example, to implement the mobile network node 41, wireless data communication congestion detector 40, and CSCF nodes 18. FIG. 7 depicts a computer with user interface elements, as may be used to implement a personal computer or other type of work station or terminal device, although the computer of FIG. 7 may also act as a server if appropriately programmed. It is believed that the general structure and general operation of such equipment as shown in FIGS. 6 and 7 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the background data communication restriction service outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the other network 29 into the computer platform of the mobile network node 41, or from a host server into a mobile device 13. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the mobile network node 41, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
   a wireless transceiver configured to provide mobile communications through a network via wireless link;
   at least one user interface element configured to provide information output to a user and receive user input;
   a processor configured to control operations of the mobile device;
   a memory;
   application programs in the memory for execution by the processor; and
   a connectivity manager program in the memory, wherein execution of the connectivity manager program by the processor configures the mobile device to implement functions, including functions to:
   determine the network is subject to wireless data communication congestion;
   activate, in response to the congestion determination, a background data communication restriction with respect to the application programs;
   prevent, while the background data communication restriction is activated, application programs from using data communications services of the network for background data communication operations; and
   receive, over the wireless link from a node of the network, an instruction to deactivate the background data communication restriction when the network is no longer subject to the wireless data communication congestion.

2. The mobile device of claim 1, wherein the implemented function to activate the background data communication restriction due to congestion comprises a function to activate the background data communication over the wireless link from a node of the network.

3. The mobile device of claim 1, wherein the implemented function to determine the network is subject to wireless data communication congestion comprises one or more functions to monitor and analyze interaction of the mobile device with the network via the wireless link and from the analysis detect a condition of the network corresponding to the wireless data communication congestion.

4. The mobile device of claim 1, wherein execution of the connectivity manager program by the processor configures the mobile device to implement functions, including further functions to:
   detect user interaction with one of the application programs via the at least one user interface element; and
   permit the one application program to use data communications services of the network for data communication operations, based on the detected user interaction, while the background data communication restriction is activated.

5. The mobile device of claim 1, wherein execution of the connectivity manager program by the processor configures the mobile device to implement functions, including further functions to:
   determine the network is no longer subject to the wireless data communication congestion in response to receipt of the instruction to deactivate the background data communication restriction;
   deactivate, when the network is no longer subject to the wireless data communication congestion, the background data communication restriction with respect to the application programs; and
   permit the one or more application programs to use data communications services of the network for the background data communication operations.

6. The mobile device of claim 5, wherein the implemented function to determine the network is no longer subject to the wireless data communication congestion comprises a function to determine that:
   a) a traffic flow associated with wireless data communications through the network remains at or above a threshold level for a particular period of time,
   b) a latency related to the wireless data communications is within an associated threshold, or
   c) a combination of a) and b) is met.

7. The mobile device of claim 5, wherein the implemented function to determine the network is no longer subject to the wireless data communication congestion comprises one or more functions to monitor and analyze interaction of the mobile device with the network via the wireless link and detect a condition corresponding to a lack of the wireless data communication congestion.

8. A system, comprising:
   mobile communication base stations configured to provide wireless communication for mobile devices;
   one or more routers, coupled to the base stations to form a mobile communication network; and
   a mobile communication network node coupled to at least one of the routers, comprising:
   a processor configured to control operations of the mobile communication network node;
   a memory;
   a mobile communication network congestion response program in the memory, wherein execution of the mobile communication network congestion response program by the processor of the mobile communication network node configures the mobile communication network node to implement functions, including functions to:

detect the mobile communication network is subject to wireless data communication congestion through an identified one or more of the mobile communication base stations;

determine, in response to the congestion detection, one or more of the mobile devices likely to obtain mobile communications service through the identified one or more mobile communication base stations;

notify each determined mobile device to activate a background data communication restriction;

detect that the mobile communication network is no longer subject to the wireless data communication congestion through the identified one or more mobile communication base stations; and notify, when no longer subject to the wireless data communication congestion, each determined mobile device to deactivate the background data communication restriction.

9. The system of claim 8, further comprising:

a wireless data communication congestion detector coupled to the mobile communication network and configured to detect the wireless data communication congestion through the identified one or more mobile communication base stations, wherein:

the wireless data communication congestion detector is further configured to generate a notification of the wireless data communication congestion through the identified one or more mobile communication base stations, and the implemented function of the mobile communication network node to detect the mobile communication network is subject to the wireless data communication congestion through the identified one or more mobile communication base stations comprises a function to receive the notification of the wireless data communication congestion through the identified one or more mobile communication base stations from the wireless data communication congestion detectors.

10. The system of claim 8, wherein execution of the mobile communication network congestion response program by the processor configures the mobile communication network node to implement functions, including further functions to:

detect the mobile communication network is no longer subject to the wireless data communication congestion based on a determination that:

a) a traffic flow associated with wireless data communications through the mobile communication network remains at or above a threshold level for a particular period of time, b) a latency related to the wireless data communications is within an associated threshold, or c) a combination of a) and b) is met.

11. The system of claim 8, further comprising:

a wireless data communication congestion detector coupled to the mobile communication network and configured to detect that the mobile communication network is no longer subject to the wireless data communication congestion through the identified one or more mobile communication base stations, wherein:

the wireless data communication congestion detector is further configured to generate a notification that the mobile communication network is no longer subject to the wireless data communication congestion through the identified one or more mobile communication base stations, and the implemented function of the mobile communication network node to detect that the mobile communication network is no longer subject to the wireless data communication congestion through the identified one or more mobile communication base stations comprises a function to receive the notification that the mobile communication network is no longer subject to the wireless data communication congestion from the wireless data communication congestion detector.

12. The system of claim 8, wherein the implemented function to determine the one or more mobile devices comprises a function to determine the one or more mobile devices based on geographic proximity of the one or more mobile devices to each other and to the identified one or more mobile communication base stations.

13. The system of claim 8, wherein the implemented function to determine the one or more mobile devices comprises a function to determine the one or more mobile devices based on a determination of the contribution of each of the one or more mobile devices to the wireless data communication congestion.

14. A method, comprising:

determining, by a mobile device, a network is subject to wireless data communication congestion;

activating, by the mobile device and in response to the congestion determination, a background data communication restriction with respect to application programs on the mobile device;

while the background data communication restriction is activated, preventing, by the mobile device, the application programs from generating any data communication over the network for background data communication operations; and receiving, by the mobile device and from a mobile communication network node via the network, an instruction to deactivate the background data communication restriction when the network is no longer subject to the wireless data communication congestion.

15. The method of claim 14, wherein the determining comprises receiving, from a mobile communication network node and over a wireless link, an instruction to activate the background data communication restriction due to the wireless data communication congestion.

16. The method of claim 14, wherein the determining comprises:

monitoring and analyzing interaction of the mobile device with the network; and detecting a condition corresponding to the wireless data communication congestion.

17. The method of claim 14, further comprising:

detecting, by the mobile device, user interaction with one of the application programs via a user interface element of the mobile device; and permitting, by the mobile device, the one application program to use data communications services of the network for data communication operations, based on the detected user interaction.

18. The method of claim 14, further comprising:

determining, by the mobile device, the network is no longer subject to the wireless data communication congestion;

deactivating, by the mobile device, the background data communication restriction with respect to the application programs, when the network is no longer subject to the wireless data communication congestion; and permitting, by the mobile device, the one or more application programs to generate data communications over the network for the background data communication operations.

19. The method of claim 18, wherein the determining the network is no longer subject to the wireless data communication congestion comprises determining that:
   a) a traffic flow associated with wireless data communications through the mobile communication network remains at or above a threshold level for a particular period of time,
   b) a latency related to the wireless data communications is within an associated threshold, or
   c) a combination of a) and b) is met.

20. The method of claim 18, wherein the determining comprises:
   monitoring and analyzing interaction of the mobile device with the network; and
   detecting a condition corresponding to a lack of the wireless data communication congestion.

* * * * *